(12) United States Patent
Donelon et al.

(10) Patent No.: US 9,725,351 B2
(45) Date of Patent: Aug. 8, 2017

(54) METHOD FOR FORMING OPAQUE QUARTZ GLASS COMPONENTS

(71) Applicant: Heraeus Quartz America LLC, Austin, TX (US)

(72) Inventors: Matthew J. Donelon, Austin, TX (US); Arno Pitzen, Austin, TX (US)

(73) Assignee: Heraeus Quartz America LLC, Austin, TX (US)

( * ) Notice: Subject to any disclaimer, the term of this patent is extended or adjusted under 35 U.S.C. 154(b) by 0 days.

(21) Appl. No.: 14/409,852

(22) PCT Filed: Dec. 23, 2013

(86) PCT No.: PCT/US2013/077505
§ 371 (c)(1),
(2) Date: Dec. 19, 2014

(87) PCT Pub. No.: WO2015/099659
PCT Pub. Date: Jul. 2, 2015

(65) Prior Publication Data
US 2016/0280577 A1    Sep. 29, 2016

(51) Int. Cl.
*C03B 23/00* (2006.01)
*C03B 23/053* (2006.01)
(Continued)

(52) U.S. Cl.
CPC .......... *C03B 23/053* (2013.01); *C03B 19/066* (2013.01); *C03B 23/00* (2013.01); *C03B 23/047* (2013.01); *C03B 23/07* (2013.01)

(58) Field of Classification Search
CPC ............................ C03B 23/047; C03B 23/207
See application file for complete search history.

(56) References Cited

U.S. PATENT DOCUMENTS 5,585,173 A    12/1996    Kamo et al.
5,674,792 A    10/1997    Moritz et al.
(Continued)

FOREIGN PATENT DOCUMENTS

EP    647600 A1    4/1995
EP    653381 B1    4/1998
(Continued)

OTHER PUBLICATIONS

JP 4485826 B2 (Sato) Jun. 23, 2010 (English language machine translation). [online] [retrieved Sep. 14, 2016]. Retrieved from: Espacenet.*
(Continued)

*Primary Examiner* — Erin Snelting
(74) *Attorney, Agent, or Firm* — Panitch Schwarze Belisario & Nadel LLP (57) ABSTRACT

A method of forming an opaque quartz glass component is provided. The method includes (a) providing a starting preform made of quartz glass; (b) heating at least a portion of the starting preform to a predetermined temperature at which the quartz glass of the starting preform has a viscosity in a range of 10E2 to 10E12 poise; and (c) deforming at least a portion of the heated preform at the predetermined temperature to change a shape and/or dimension(s) of the heated perform in order to form the opaque quartz glass component. The starting preform and the heated preform have respective densities of at least 2.15 g/cm$^3$ and at least 2.10 g/cm$^3$. The starting perform and the opaque quartz glass component have respective direct spectral transmissions of approximately 0.1-1% and 0.2-3% in the wavelength range of $\lambda$=190 nm to $\lambda$=4990 nm at a wall thickness of 3 mm and a diffuse reflectance of at least 60% in a wavelength range of $\lambda$=190 nm to $\lambda$=2500 nm.

13 Claims, 5 Drawing Sheets

(51) Int. Cl.
*C03B 19/06* (2006.01)
*C03B 23/047* (2006.01)
*C03B 23/07* (2006.01)

(56) References Cited

U.S. PATENT DOCUMENTS

| | | | |
|---|---|---|---|
| 5,736,206 | A | 4/1998 | Englisch et al. |
| 5,866,062 | A | 2/1999 | Moritz et al. |
| 7,832,234 | B2 | 11/2010 | Hoppe et al. |
| 8,153,336 | B2 | 4/2012 | Abe et al. |
| 2002/0134108 | A1 | 9/2002 | Werdecker et al. |
| 2007/0082149 | A1 | 4/2007 | Linnot et al. |
| 2010/0107694 | A1 | 5/2010 | Dannoux et al. |
| 2010/0316858 | A1 | 12/2010 | Sato et al. |

FOREIGN PATENT DOCUMENTS

| | | | | |
|---|---|---|---|---|
| FR | 2156554 | A1 * | 6/1973 | .......... C03B 23/207 |
| JP | H04-26522 | A | | 1/1992 |
| JP | H08-143329 | A | | 6/1996 |
| JP | 11199252 | | | 7/1999 |
| JP | 2004149325 | A | | 5/2004 |
| JP | 2005145740 | A | | 6/2005 |
| JP | 04026522 | B2 | | 12/2007 |
| JP | 2010-111557 | A | | 5/2010 |
| JP | 4485826 | B2 | | 6/2010 |
| WO | 9513248 | A1 | | 5/1995 |

OTHER PUBLICATIONS

International Search Report and Written Opinion dated Sep. 9, 2014 in International Application No. PCT/US2013/077505.
International Preliminary Report on Patentability issued Jul. 7, 2016 in International Application No. PCT/US2013/077505.
Office Action dated Mar. 6, 2017 in JP Application No. 2016-542685.

* cited by examiner

METHOD FOR FORMING OPAQUE QUARTZ GLASS COMPONENTS

CROSS-REFERENCE TO RELATED APPLICATION

This application is a Section 371 of International Application No. PCT/US2013/077505, filed Dec. 23, 2013, the disclosure of which is incorporated herein by reference.

BACKGROUND OF THE INVENTION

The present invention relates to a method for forming opaque quartz glass or silica glass components, more particularly, for forming and shaping fused quartz or fused silica glass into an opaque processing component of a desired shape and dimensions.

Quartz glass processing components, such as tubes, rods, panels, domes, plates, rings, and blocks, either as semi-finished or finished goods, are important components for heat engineering applications, in which good thermal insulation along with high temperature stability and thermal fatigue resistance are essential. Applications of the semiconductor industry, in particular, put ever increasing demands on the use of opaque quartz glass tubes and other components. These applications require the quartz glass components to be opaque, mainly in the infrared region of the wavelength spectrum, and also to be as pure as possible. However, these demands can be difficult to meet, as opacity and purity tend to be competing properties. More particularly, impurities present in the quartz glass actually contribute to the opacity of the glass, and thus opaque quartz glass typically has a low purity.

Impure opaque quartz glass is generally not suitable for use in applications such as those described above (i.e., the semiconductor industry) because of the significant negative effects of the impurities contained in the glass. Specifically, any contaminations present can cause contamination of the semiconductor wafers, devitrification of the quartz glass, resulting in brittleness and reduced thermal fatigue resistance of the quartz glass components formed therefrom. Also, quartz glass components fabricated from impure opaque quartz glass tend to have an inhomogeneous distribution of relatively large sized pores, which contributes only little to opacity, causes the density of the opaque quartz glass to be low, and reduces the mechanical stability and the serviceable life of the quartz glass component.

Thus, processes have been developed for forming a relatively pure and opaque quartz glass component using pure starting materials. Examples of high purity quartz glass can be found in U.S. Pat. Nos. 5,585,173; 5,674,792 and 5,736,206. Such processes typically begin with a preform or blank of an opaque and pure quartz glass. Such preforms are typically in the form of large blocks of quartz glass. However, it was found that, when the glass preforms were subjected to heating, such as in a thermal reforming process, the starting opaque glass becomes clear or transparent and loses its opacity. Such thermal reforming processes are described in various prior art references, such as Japanese Application Nos. 04026522 and 4485826; Japanese Application Publication Nos. 2004-149325 and 2005-145740; U.S. Pat. No. 7,832,234; and U.S. Application Publication No. 2010/0107694. However, none of these references are directed to thermal reforming of opaque and pure quartz glass. U.S. Patent No. 2002/0134108 does describe a thermal reforming process for opaque quartz glass, but the glass is a synthetic quartz glass.

The loss of opacity of the starting opaque and pure quartz glass, when subjected to thermal reforming, is particularly problematic for the formation of thin-walled opaque components, such as quartz glass tubes or tube sections, since the block-shaped quartz glass preform must be subjected to significant thermal reforming to achieve the desired tubular shape and low wall thickness. Accordingly, such thermal reforming processes have generally been avoided when the starting preform is made of pure and opaque quartz glass.

Instead, opaque quartz glass components (such as tubes and tube sections) are conventionally formed by starting with a preform of opaque and pure quartz glass and then mechanically machining the glass preform into the desired shape to form an opaque quartz glass component. Such mechanical machining processes include, for example, grinding, polishing, machining, core drilling, ultrasonic milling, laser cutting, or the like of the glass preform until the desired shape and dimensions are achieved. However, depending on the quartz glass component being made, a significant portion of the pure quartz glass of the starting preform may be wasted as a result of the mechanical treatment. For example, when making a ring or a short tube, such as for a semiconductor processing tube, typically only approximately 15% of the quartz glass of the starting preform is actually utilized in the opaque quartz glass component (i.e., the ring). The remaining 85% of the expensive opaque pure quartz glass is simply wasted. Thus, conventional mechanical machining processes for forming pure and opaque quartz glass components are costly and generally inefficient.

Accordingly, it would be desirable to provide a method and system for forming components made of a high purity and high opacity quartz glass in a cost-effective manner.

More particularly, it would be beneficial to provide simplified, efficient and cost-effective systems and methods for forming opaque and pure fused quartz glass into components, such as domes, tubes, tubular sections, plates, rods, panels, and rings for use in the semiconductor industry.

BRIEF SUMMARY OF THE INVENTION

One embodiment of the present invention is directed to a method of forming an opaque quartz glass component. The method includes (a) providing a starting preform made of quartz glass, the starting preform having a direct spectral transmission of approximately 0.1 to 1% in a wavelength range of $\lambda=190$ nm to $\lambda=4990$ nm and a diffuse reflectance of at least 60% in a wavelength range of $\lambda=190$ nm to $\lambda=2500$ nm at a wall thickness of 3 mm and a density of at least 2.15 g/cm$^3$, at least 80% of pores of the starting preform having a maximum pore dimension of between 1 and 20 µm; (b) heating at least a portion of the starting preform to a predetermined temperature at which the quartz glass has a viscosity in a range of 10E2 to 10E12 poise and a density of at least 2.10 g/cm$^3$, at least 80% of pores of the heated preform having a maximum pore dimension of between 1 and 45 µm; and (c) deforming at least a portion of the heated preform at the predetermined temperature to change at least one of a shape and dimension(s) of the heated preform in order to form the opaque quartz glass component. The opaque quartz glass component has a direct spectral transmission of approximately 0.2 to 3% in a wavelength range of $\lambda=190$ nm to $\lambda=4990$ nm at a wall thickness of 3 mm and a diffuse reflectance of at least 60% in a wavelength range of $\lambda=190$ nm to $\lambda=2500$ nm.

BRIEF DESCRIPTION OF THE DRAWINGS

The foregoing summary, as well as the following detailed description of preferred embodiments of the present invention, will be better understood when read in conjunction with the appended drawings. For the purpose of illustration, there is shown in the drawings embodiments which are presently preferred. It should be understood, however, that the system and method are not limited to the precise arrangements and instrumentalities shown.

In the drawings.

DETAILED DESCRIPTION OF THE INVENTION

The present invention relates to a method for forming highly pure and opaque fused quartz glass, and more particularly for forming highly pure and opaque fused quartz glass components of a desired shape. It will be understood by those skilled in the art that the components described herein are merely exemplary, and the below-described methods may be used to form various types of components which may be utilized for various types of purposes and applications. More particularly, the present invention relates to the manufacture of various types of components of opaque quartz glass which are manufactured from pure starting materials and which are particularly suited for use in applications requiring high thermal insulation and high temperature uniformity.

It will be understood that, in the context of this application, the terms "about" or "approximately" mean a variation of ±5% of the recited or claimed values, and more preferably a variation of ±2% of the recited or claimed values, and most preferably the exact recited or claimed values.

Although the terms may be used to denote compositions or components of different silica concentrations, as they are used herein, the term "quartz glass" may be used interchangeably with "silica glass," "fused quartz glass," or "fused silica glass."

The first step of the process of the present invention is providing an opaque starting preform, blank or body of a quartz glass. Preferably, the material used to form the opaque starting preform is highly pure, amorphous silicon dioxide having a chemical purity of approximately 95 to 99.9999%, and more preferably approximately 99.9999%, which is produced from quartz sand or rock crystal. Preferably, the quartz glass of the starting preform is made from natural silica. It will be understood that the quartz glass of the starting material may also include one or more dopants, as long as microstructure of the quartz glass is not affected. It will be understood by those skilled in the art that any starting material which meets the above-discussed criteria may be used for formation of the starting preform. Most preferably, however, the starting material is the starting material described in U.S. Pat. No. 5,674,792 of Moritz et al. ("Moritz") and/or U.S. Pat. No. 5,736,206 of Englisch et al. ("Englisch"), the entire disclosures of which are incorporated herein by reference.

The opaque starting preform is preferably produced by a slip casting method. However, it will be understood by those skilled in the art that the starting preform may be formed by any conventionally known technique for forming a glass preform, such as powder pressing, tape casting, roll compacting, isostatic powder pressing, sol-gel, and the like. Most preferably, the starting preform is formed from the starting material by the slip casting method disclosed in Moritz and Englisch. A brief description of the process for forming the starting preform, as disclosed in Moritz and Englisch, is as follows.

The starting material (i.e., amorphous silicon dioxide having a chemical purity of 99.9% produced from quartz sand or rock crystal) is ground up into a powder with a particle diameter of less than 70 μm. A slip is then formed from the powder and stabilized over the course of 1-240 hours by being kept in continuous motion. The stabilized slip is cast into a porous mold corresponding to the preform and allowed to remain there for a certain period of time. The preform blank is then removed from the mold, dried, and heated in a furnace at a heating rate of 1-60 K/min to a sintering temperature in the range of approximately 1,350° C.-1,450° C. The sintered preform is then exposed to a temperature of more than approximately 1,300° C. for at least 40 minutes and cooled.

Preferably, the starting preform formed from the starting material is a quartz glass body that is highly pure, opaque, porous, gas-impermeable, and has a cristobalite content of no more than 1%. As will be understood by those skilled in the art, the opacity of a material is directly related to the direct spectral transmission of the material, which is a measure of the amount of light transmitted by the material. Highly opaque materials mostly block, reflect or absorb light and only transmit a small amount of light, and thus have a relatively low direct spectral transmission. More particularly, the starting preform preferably has a nearly constant direct spectral transmission of less than approximately 5%, and more preferably less than approximately 3%, and most preferably less than approximately 2%, in the wavelength range of nm to λ=4990 nm and for a 3 mm wall thickness. In one embodiment, the starting preform preferably has a nearly constant direct spectral transmission of approximately 0.1 to 1% in the wavelength range of λ=190 nm to λ=4990 nm and for a 3 mm wall thickness. In another embodiment, the starting preform preferably has a nearly constant direct spectral transmission of approximately 0.1 to 0.5% in the wavelength range of $\lambda=190$ nm to $\lambda=4990$ nm and for a 3 mm wall thickness. More particularly, the starting preform preferably has a nearly constant diffuse reflectance of more than approximately 50%, and more preferably more than approximately 55%, and most preferably more than approximately 60%, in the wavelength range of $\lambda=190$ nm to $\lambda=2500$ nm and for a 3 mm wall thickness.

The chemical purity of the starting preform is preferably at least 95% and more preferably in the range of approximately 99 to 99.9%, and most preferably in the range of approximately 99.5 to 99.9999%. The starting preform also preferably has a density of approximately 2.12 to 2.19 g/cm$^3$ and more preferably approximately 2.13 to 2.17 g/cm$^3$. In one embodiment, the starting preform preferably has a density of at least 2.15 g/cm$^3$ and more preferably approximately 2.17-2.18 g/cm$^3$.

At least 80% of the pores of the starting preform have a maximum pore dimension of approximately 20 μm or less. Preferably, at least 80% of the pores of the starting preform have a maximum pore dimension of between approximately 5 and 20 μm, and more preferably between approximately 10 and 20 μm, and most preferably between approximately 15 and 20 μm. The pore content (i.e., porosity) of the starting preform is at most approximately 5% per unit volume, and preferably approximately 0.1 to 4.5% per unit volume, and more preferably approximately 0.2 to 4% per unit volume. More specifically, the porosity of the starting preform is preferably at most 2.5% and most preferably in the range of approximately 1 to 2.5% per unit volume.

Most preferably, the starting preform has all of the properties and characteristics of the molded or shaped bodies disclosed in Moritz and Englisch.

The starting preform can be manufactured in any desired shape by the slip-casting process described above and in Moritz and Englisch. For example, the shape of the starting preform may be cubic, tubular, rectangular, elliptical, cylindrical, conical, spherical, frustoconical, or the like. Further, the starting preform may be hollow, partially hollow or completely solid throughout. Preferably, the starting preform is formed in a shape that generally conforms to or complements the shape of the opaque quartz glass components to be produced therefrom, such that material and labor costs and forming time will be reduced.

For example, if the opaque quartz glass component is a dome for a reactor, the starting preform is preferably in the form of a generally flat disc, rather than a block, as a disc would require less reforming and reshaping than a block for formation of a dome-shaped component. It will also be understood by those skilled in the art that the dimensions of the starting preform may vary based upon the dimensions of the opaque quartz glass component to be fabricated from the starting preform. Thus, it will be understood that while preferred embodiments are discussed in detail below, the present invention is in no way limited to the particular shapes, sizes, configuration and dimensions discussed herein.

Next, the opaque starting preform may optionally be subjected to a mechanical machining process, such as grinding, machining, core drilling, ultrasonic milling, laser cutting, hot forming of solids consisting of reshaping the ingot, and the like to resize the starting preform to better correspond to the dimensions of the opaque quartz glass component to be fabricated therefrom. Such an optional step is preferably performed only if necessary or desired to resize the opaque starting preform to better correspond to the dimensions of the opaque component to be fabricated from the starting preform.

Preferably, all surfaces of the starting preform are generally smooth and free of foreign particles. Known mechanical and/or chemical finishing processes, such as polishing and grinding, may optionally be employed to ensure that the surfaces of the starting preform have the preferred degree of smoothness and are free of any foreign particles or impurities.

Next, the opaque starting preform is reformed or resized to form the opaque quartz glass component. More particularly, at least a portion or zone of the starting preform is heated to a predetermined temperature at which the pure and opaque quartz glass of the starting preform begins to soften. More preferably, the entire starting preform is heated (optionally in a zone-wise manner) to a predetermined temperature at which the pure and opaque quartz glass begins to soften. Preferably, the starting preform is heated to a temperature of approximately 1100 to 2300° C., and more preferably approximately 1200 to 2200° C., and most preferably approximately 1250 to 2150° C. At such temperatures, the opaque quartz glass preferably has a viscosity of between approximately 10E12 and 10E2 poise, more preferably between approximately 10E10 and 10E5 poise, and most preferably approximately 10E6 poise, such that the quartz glass may be worked with to resize or reshape the starting preform to the predetermined and desired shape and dimensions of the opaque quartz glass component.

Also, at such temperatures, the heated and softened starting preform has a direct spectral transmission which is substantially constant and less than approximately 5%, and more preferably less than approximately 3%, and most preferably less than approximately 2%, in the wavelength range of $\lambda=190$ nm to $\lambda=4990$ nm and for a 3 mm wall thickness and a diffuse reflectance of at least 60% in a wavelength range of $\lambda=190$ nm to $\lambda=2500$ nm. More particularly, the heated and softened starting preform preferably has a nearly constant direct spectral transmission of approximately 0.2 to 3%, and more preferably approximately 0.2 to 1.5% in the wavelength range of nm to $\lambda=4990$ nm and for a 3 mm wall thickness and a diffuse reflectance of at least 60% in a wavelength range of $\lambda=190$ nm to $\lambda=2500$ nm. The chemical purity of the heated and softened starting preform is preferably substantially unchanged from that of the starting preform (i.e., preferably at least 95% and more preferably in the range of approximately 99.0 to 99.9%, and most preferably in the range of approximately 99.5 to 99.9999%). However, the density, porosity and pore dimensions of the heated and softened starting preform preferably have changed, at least slightly, from those of the starting preform.

More specifically, the heated and softened starting preform preferably has a density of approximately 2.08 to 2.19 g/cm$^3$ and more preferably approximately 2.10 to 2.18 g/cm$^3$. In one embodiment, the heated and softened starting preform preferably has a density of at least approximately 2.10 g/cm$^3$ and more preferably approximately 2.14 to 2.15 g/cm$^3$. Also, at least 80% of the pores of the heated and softened starting preform have a maximum pore dimension of approximately 60 or less. Preferably, at least 80% of the pores of the heated and softened starting preform have a maximum pore dimension of between approximately 10 and 45 μm, and more preferably between approximately 20 and 45 μm, and most preferably between approximately 25 and 45 μm. As such, in the heated and softened starting preform, the pores have expanded from the starting preform. The pore content (porosity) of the heated and softened starting preform 10 is at most approximately 5% per unit volume, and preferably approximately 0.1 to 5% per unit volume, and more preferably approximately 0.2 to 4.5% per unit volume. More specifically, the porosity of the heated and softened starting preform is preferably at most 4.7% and most preferably in the range of approximately 2 to 4.5% per unit volume.

While the starting preform is being heated, at least a portion or zone of the starting preform is also preferably being deformed to change one or more dimensions and/or a shape of the starting preform 10. More particularly, while the starting preform is being heated, the starting preform is also subjected to a resizing or reforming process to change the size and/or shape of the starting preform to fabricate the desired opaque quartz glass component.

Any known thermal reshaping, reforming or resizing process may be used to process the starting preform 10 into the opaque quartz glass component. For example, the starting preform 10 may be subjected to one or more of the following processes: drawing, blowing, slumping, pressing, reaming, reflowing, and the like. A particularly preferred thermal reformation method is disclosed in U.S. Patent Application No. 2002/0134108 of Werdecker et al. ("Werdecker"), the entire disclosure of which is incorporated herein by reference.

Further, various techniques and mechanisms may be employed to facilitate reshaping, reforming or resizing of the starting preform into the opaque quartz glass component. For example, one or more insert devices, one or more compressive devices, compressive pressure, and one or more drawing or stretching devices may be utilized to expand, contract, resize and/or reshape the starting preform to the desired dimensions and shape of the opaque quartz glass component.

The parts used for the reforming, reshaping and/or resizing processes of the starting preform are each preferably made of graphite, quartz glass, silicon carbide or other refractory ceramic or refractory metallic materials. More preferably, the parts are each made entirely of graphite, and most preferably of pure graphite, since quartz glass does not react with or adhere to graphite. However, it will be understood by those skilled in the art that every processing part need not be made entirely of graphite. Instead, some processing parts may be made entirely of graphite, while others are made of quartz glass, silicon carbide or other refractory ceramic or refractory metallic materials and include graphite or a non-stick and non-reactive coating only on the surfaces which will actually contact the quartz glass of the starting preform.

It will be understood by those skilled in the art that the time required for reforming, reshaping and/or resizing of the starting preform to form the opaque quartz glass component will vary based on several factors, such as the heating temperature, the presence or absence of any compressive pressure, the shape and size of the starting preform 10, the shape and size of the opaque quartz glass component, and the like.

During the reshaping, reforming and/or resizing of the starting preform into the opaque quartz glass component, the quartz glass of the starting preform remains opaque. More particularly, during reshaping, reforming and/or resizing of the starting preform, the quartz glass preferably undergoes less than a 10% change in the optical properties thereof, and more preferably less than a 5% change in opacity, and most preferably less than a 3% change in opacity, in the wavelength range of $\lambda=190$ nm to $\lambda=4990$ nm and for a 3 mm wall thickness.

After the quartz glass of the starting preform has been reformed, resized and/or reshaped into the desired opaque quartz glass component, the opaque quartz glass component is subjected to a cooling period of a predetermined duration, particularly to prevent devitrification of the fused quartz glass. Preferably, the opaque quartz glass component is allowed to cool to room temperature, which typically takes approximately 1 to 30 minutes, and more preferably approximately 20 minutes. It will be understood by those skilled in the art that other cooling techniques known in the art or to be developed may be employed, particularly to expedite the cooling process.

Figure 7:
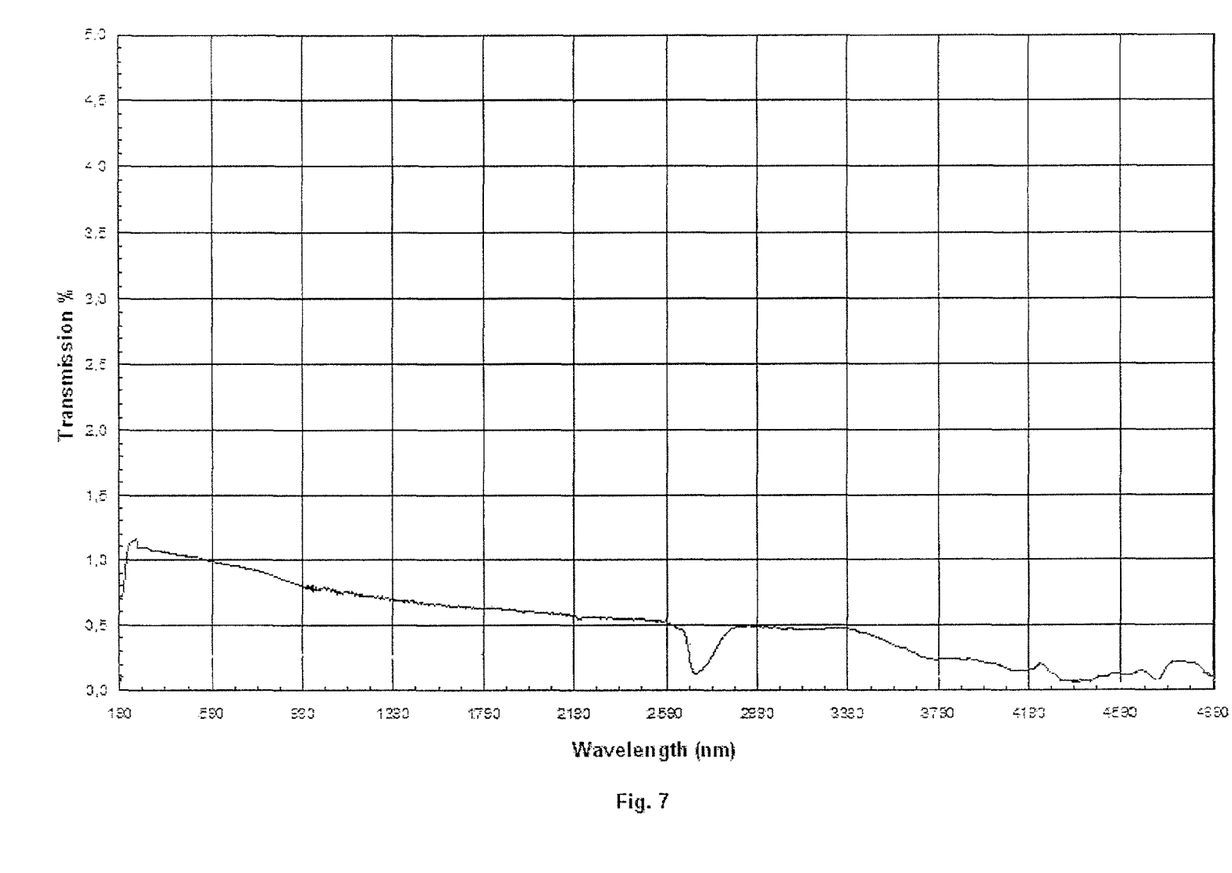
FIG. 7 is a graphical representation of the direct spectral transmission of an opaque quartz glass component in accordance with an embodiment of the present invention.

The opaque quartz glass component according to the present invention is opaque and highly pure. More particularly, the quartz glass of the opaque quartz glass component has preferably undergone less than a 10% change in the optical properties thereof, and more preferably less than a 5% change in opacity, and most preferably less than a 3% change in opacity, in the wavelength range of $\lambda=190$ nm to $\lambda=4990$ nm and for a 3 mm wall thickness. In one embodiment, there is only an approximately 3% to 5% loss in the light blocking properties of the opaque quartz glass component and the opaque quartz glass component has a nearly constant direct spectral transmission of less than approximately 5%, and more preferably less than approximately 3%, and most preferably less than approximately 2%, in the wavelength range of $\lambda=190$ nm to $\lambda=4990$ nm and for a wall thickness of 3 mm and a diffuse reflectance of at least 60% in a wavelength range of $\lambda=190$ nm to $\lambda=2500$ nm. More particularly, the opaque quartz glass component preferably has a nearly constant direct spectral transmission of approximately 0.2 to 3%, and more preferably approximately 0.2 to 1.5% in the wavelength range of $\lambda 190$ nm to $\lambda=4990$ nm and for a 3 mm wall thickness and a diffuse reflectance of at least 60% in a wavelength range of $\lambda=190$ nm to $\lambda=2500$ nm. In one embodiment, the opaque quartz glass component has a nearly constant direct spectral transmission of approximately 1% in the wavelength range of $\lambda=190$ nm to $\lambda=4990$ nm and for a wall thickness of 3 mm and a diffuse reflectance of at least 60% in a wavelength range of $\lambda=190$ nm to $\lambda=2500$ nm. A graphical representation of the direct spectral transmission of the opaque quartz glass component according to one embodiment of the present invention is shown in FIG. 7. In addition, the opaque quartz glass component has a thermal conductivity of approximately 1.3 W/m-K at 23° C.

The chemical purity of the opaque quartz glass component is preferably substantially unchanged from that of the starting preform (i.e., at least 95%, and more preferably in the range of approximately 99 to 99.9%, and most preferably in the range of approximately 99.5 to 99.9999%). The opaque quartz glass component also preferably has a density of at least 2.10 g/cm$^3$ and, preferably approximately 2.12 to 2.19 g/cm$^3$, and more preferably approximately 2.13 to 2.18 g/cm$^3$. Most preferably, the opaque quartz glass component has a density of approximately 2.14 to 2.15 g/cm$^3$.

Preferably, at least 80% of the pores of the opaque quartz glass component have a maximum pore dimension of approximately 60 µm or less, and more preferably between approximately 10 and 45 µm, and most preferably between approximately 25 and 45 µm. The pore content (porosity) of the opaque quartz glass component is at most approximately 5% per unit volume, and preferably approximately 0.1 to 5% per unit volume, and more preferably approximately 0.2 to 4.5% per unit volume. More specifically, the porosity of the opaque quartz glass component is preferably at most 4.7% and most preferably in the range of approximately 2 to 4.5% per unit volume.

Figure 4:
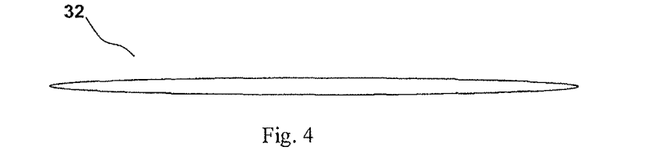
FIG. 4 is a side perspective view of a disc-shaped preform in accordance with an embodiment of the present invention.

No subsequent mechanical processes, such as grinding, need be employed. As such, the opaque quartz glass component is formed by a process which is more cost-effective and less time-consuming that conventional techniques. In particular, preferably at most 25%, and more preferably at most 15%, of the quartz glass material of the starting preform 10 is machined away to form the opaque quartz glass component. Most preferably, only between approximately 0% and 10% of the quartz glass material of the starting preform 10 is machined away to form the opaque quartz glass component. However, it will be understood by those skilled in the art that where no resizing of the starting preform 10 is required (such as with the starting preform 10 of FIG. 1 which is an opaque hollow tube and the opaque quartz glass component is an opaque spacer tube as shown in FIG. 4), there will be no loss of the quartz glass material of the starting preform. Also, a customized starting preform need not be made for every type of opaque quartz glass component. Instead, thermal reforming or resizing techniques may be utilized to form any type of opaque quartz glass component of any dimensions from a single starting preform.

The opaque quartz glass component according to the present invention may have any desired shape and/or dimensions. Preferably, opaque quartz glass components according to the present invention serve as parts for the semiconductor industry (e.g., for semiconductor wafer processing). For example, the opaque quartz glass components may be a dome, tube, tubular section or body, or ring for a semiconductor wafer processing chamber. The process of the present invention is particularly suited for making opaque quartz glass thin-walled tubes (i.e., tubes with wall thicknesses of 0.5 to 15 mm) of varying lengths (i.e., 10 mm to 5,000 mm) and opaque quartz glass domes for semiconductor wafer processing chambers. More preferably, the opaque quartz glass components according to the present invention may be utilized for any processing which requires high temperature uniformity and stability, minimal heat conductivity, high purity, minimal heat and/or radiation loss (i.e., high thermal insulation), a controlled atmosphere, and/or high thermal fatigue resistance.

The invention will now be described further in connection with the following, non-limiting examples.

Example 1

Figure 1A:
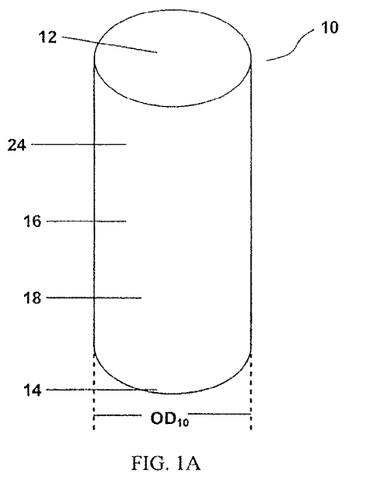
FIG. 1A is a perspective view of a cylindrical solid starting preform in accordance with an embodiment of the present invention.
Figure 1B:
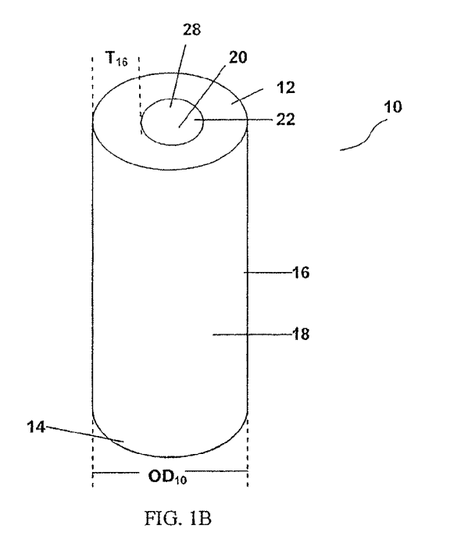
FIG. 1B is a perspective view of the cylindrical solid starting preform shown in FIG. 2A after the formation of a borehole therethrough.
Figure 3:
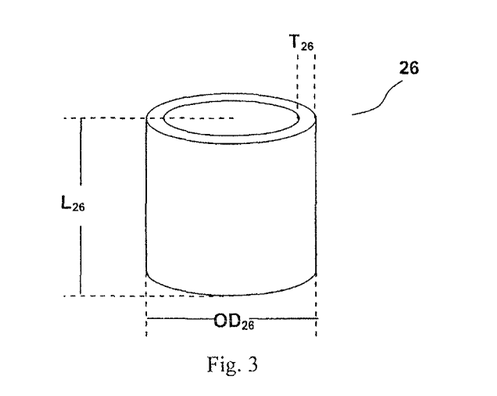
FIG. 3 is a perspective view of a short tube produced from either the cylindrical solid preform shown in FIG. 1A or the tubular starting preform shown in FIG. 2 in accordance with an embodiment of the present invention.

A thin walled short tube 26, and more particularly, a spacer tube 26, for a semiconductor wafer processing chamber, shown in FIG. 3, was made utilizing a starting preform 10 made of highly pure and opaque quartz glass, as shown in FIGS. 1A-1B. Referring to FIG. 1A, the opaque starting preform 10 is a solid cylinder having a generally circular cross-sectional shape. More particularly, the starting preform 10 has a first or upper end 12, a second or lower end 14, and a cylindrical body 24 extending between or from the first end 12 to the second end 14. The cylindrical body 24 has an exterior surface 18. The starting preform 10 had an outer diameter $OD_{10}$ of approximately 300 mm. It will be understood by those skilled in the art that the starting preform 10 may have any outer diameter. In a preferred embodiment, the outer diameter of the starting preform is approximately 100 to 300 mm.

After the starting preform 10 shown in FIG. 1A is formed, a bore or hole 28 is drilled or otherwise formed through the interior of the starting preform 10 from the first end 12 to the second end 14, as shown in FIG. 1B, thus forming a generally tubular preform 10 having a tubular sidewall 16 with an interior surface 20 surrounding a generally cylindrical interior cavity 22. The tubular sidewall 16 had a thickness $T_{16}$ of approximately 70 mm. It will be understood by those skilled in the art that the tubular sidewall 16 of the starting preform 10 may have any thickness. In a preferred embodiment, the thickness $T_{16}$ of the tubular sidewall 16 of the starting preform is approximately 20 to 70 mm.

The quartz glass material of the starting preform 10 was highly pure, amorphous silicon dioxide produced from quartz sand or rock crystal and having a chemical purity of approximately 99.9%. More particularly, the starting preform 10 was produced from the starting material and by the slip casting method disclosed in Moritz and Englisch. The starting preform 10 had a cristobalite content of no more than 1%, a generally constant direct spectral transmission of less than approximately 5% in the wavelength range of $\lambda=190$ nm to $\lambda=4990$ nm and a diffuse reflectance of at least 60% in a wavelength range of $\lambda=190$ nm to $\lambda=2500$ nm, a chemical purity of at least approximately 95%, a density of at least approximately 2.15 g/cm$^3$, and a porosity of at most approximately 2.5%. Also, approximately 80% of the pores of the opaque starting preform 10 had a maximum pore dimension of between approximately 1 and 20 μm.

The starting preform 10 was then resized to the desired diameter and wall thickness of the short tube 26 by a blowing process. Specifically, the starting preform 10 was horizontally-oriented, rotated about its longitudinal axis, and then continually advanced by a feeding mechanism (not shown) into a furnace (not shown). In the furnace, successive zones of the starting preform 10 were heated to a temperature of approximately 2000° C., at which point the viscosity of the quartz glass of each heated zone was approximately 10E4 poise. Simultaneously, air pressure was applied in the internal cavity 22 of the starting preform 10 and this internal overpressure caused the successive heated zones of the starting preform, which were quite viscous at this point, to be blown out or expanded. The applied heat and air pressure facilitated expansion of the starting preform 10 to form a long and expanded opaque quartz glass tube. The long and expanded opaque quartz glass tube had a length of approximately 600 mm, an outer diameter of approximately 354 mm and a sidewall thickness of approximately 6 mm. It will be understood by those skilled in the art that the dimensions of the long and expanded opaque quartz glass tube may vary as necessary to meet the particular specifications of the end use or application. For example, in one embodiment, the long and expanded opaque quartz glass tube may have an outer diameter of up to 360 mm and a sidewall thickness of 2 to 100 mm.

Finally, the long and expanded opaque quartz glass tube was allowed to cool and cut into short tubes 26 of the desired length. More particularly, each resulting tube 26 had a length $L_{26}$ of approximately 100 mm, an outer diameter $OD_{26}$ of approximately 354 mm and a sidewall thickness $T_{26}$ of approximately 6 mm. However, it will be understood that short tubes of any desired dimensions may be cut from the long and expanded opaque quartz glass tube.

The opaque quartz glass component in the form of the short tube 26 was opaque and made of highly pure quartz glass. More particularly, the tube 26 had a chemical purity of at least approximately 95%, a density of at least approximately 2.10 g/cm$^3$, and a porosity of at most approximately 4.5%. Also, approximately 80% of the pores of the short tube 26 had a maximum pore dimension of approximately 45 µm. The short tube 26 also had a nearly constant direct spectral transmission of approximately 1% in the wavelength range of λ=190 nm to λ=4990 nm for a 3 mm wall thickness and a diffuse reflectance of at least 60% in a wavelength range of λ=190 nm to λ=2500 nm.

Example 2

Figure 2:
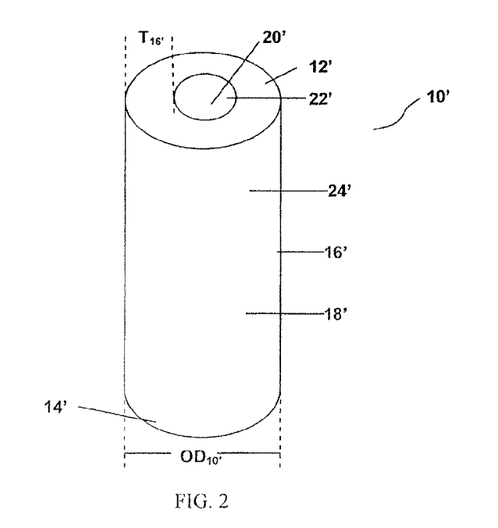
FIG. 2 is a perspective view of a tubular and hollow starting preform in accordance with an embodiment of the present invention.

The tube 26 of FIG. 3 was made utilizing a starting preform 10' made of highly pure and opaque quartz glass, as shown in FIG. 2. It will however be understood that the spacer tube 26 may alternatively be made utilizing the starting preform 10 of FIGS. 2A-2B.

The opaque starting preform 10' of FIG. 2 is structurally identical to the starting preform 10 shown in FIG. 1B (i.e., the starting preform 10' has a first or upper end 12', a second or lower end 14', and a cylindrical body 24' extending between or from the first end 12' to the second end 14'). That is, the opaque starting preform 10' of FIG. 2 is already tubular in form and thus no borehole needs to be formed through the preform body. Accordingly, hereinafter, while reference will only be made to the starting preform 10', it will be understood that the same processes may be applied for resizing, reshaping and/or reformation of the starting preform 10. The starting preform 10' was made by the same process and from the same starting materials as that of Example 1.

The tubular sidewall 16' of the starting preform 10' had a thickness $T_{16'}$ of approximately 50 mm. The exterior surface 18' and the interior surface 20' of the sidewall 16' of the starting preform 10' were subjected to an optional grinding process to resize the sidewall 16' to form concentric and uniform inner and outer diameters and to achieve a predetermined wall thickness $T_{16'}$ of approximately 6 to 20 mm. It will be understood by those skilled in the art that the thickness of the starting preform 10' before and after grinding may vary as necessary to meet the particular specification of the end use or application.

In one embodiment, the exterior surface 18' and the interior surface 20' of the sidewall 16' of the starting preform 10' are subjected to a grinding process until an outer diameter $OD_{10'}$ of approximately 235 mm and a sidewall thickness $T_{16'}$ of approximately 6 to 9 mm is achieved. In another embodiment, the exterior surface 18' and the interior surface 20' of the sidewall 16' of the starting preform 10' are subjected to a grinding process until an outer diameter $OD_{10'}$ of approximately 200 mm and a sidewall thickness $T_{16'}$ of approximately 10 mm is achieved. It will also be understood by those skilled in the art that the starting preform 10' may have any length as necessary to suit the particular specifications of the end use or application.

The starting preform 10' was then resized to the desired diameter and wall thickness of the spacer tube 26 by a blowing and drawing process. Specifically, the starting preform 10' was horizontally-oriented, dummy tubes (not shown) were attached to each end of the starting preform 10', and the starting preform 10' was then rotated about its longitudinal axis while successive zones of the starting preform 10' were heated to a temperature of approximately 2000° C. by gas burners (not shown), at which point the viscosity of the quartz glass of each heated zone was approximately 10E4 poise. The speed of rotation of the starting preform 10' was approximately 10-200 RPM. Simultaneously, air pressure and/or centrifugal force was applied in the internal cavity 22' of the starting preform 10' and the internal overpressure and/or centrifugal force caused the successive heated zones of the starting preform 10', which were quite viscous at this point, to be blown out or expanded to form an expanded opaque quartz glass tube. The expanded opaque quartz glass tube had a length of approximately 600 mm, an outer diameter of approximately 354 mm and a sidewall thickness of approximately 6 mm. It will be understood by those skilled in the art that the dimensions of the expanded opaque quartz glass tube may vary as necessary to meet the particular specifications of the end use or application.

It will also be understood that expansion of the starting preform 10' to reach the desired outer diameter and sidewall thickness may be done in a series of successive heating applications, such that the starting preform 10' reaches a first outer diameter and sidewall thickness after a first heating application, then reaches a second outer diameter and sidewall thickness which are larger than the first outer diameter and sidewall thickness after a second heating application, and so on until the desired outer diameter and sidewall thickness are achieved.

Finally, the expanded opaque quartz glass tube was allowed to cool for approximately 10 minutes, although any cooling time may be employed, and then cut into short tubes 26 of the desired length. More particularly, each resulting tube 26 had a length of approximately 100 mm. However, it will be understood that short tubes of any desired length may be cut from the long and expanded opaque quartz glass tube.

The opaque quartz glass component in the form of the tube 26 was opaque and made of highly pure quartz glass. More particularly, the tube 26 had a chemical purity of at least approximately 95%, a density of at least approximately 2.10 g/cm³, and a porosity of at most approximately 4.5%. Also, approximately 80% of the pores of the short tube 26 had a maximum pore dimension of approximately 45 µm. The short tube 26 also had a nearly constant direct spectral transmission of approximately 1% in the wavelength range of λ=190 nm to λ=4990 nm for a 3 mm wall thickness and a diffuse reflectance of at least 60% in a wavelength range of λ=190 nm to λ=2500 nm.

Example 3

Figure 5:
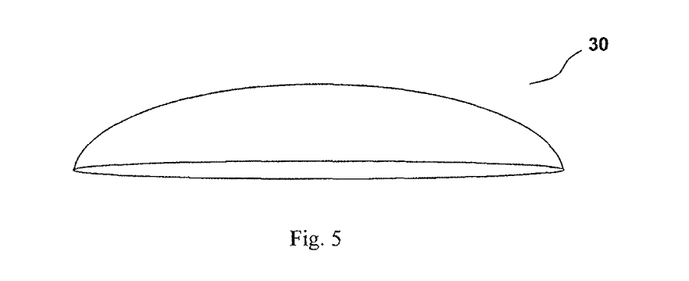
FIG. 5 is a side elevational view of a dome produced from the disc-shaped starting preform shown in FIG. 4 in accordance with an embodiment of the present invention.

A dome 30 for a semiconductor wafer processing chamber, shown in FIG. 5, was made utilizing a starting preform 32, shown in FIG. 4. The starting preform 32 was made of highly pure and opaque quartz glass. The starting material and the process for making the starting preform 32 was identical to that of the starting preforms 10, 10'; of Examples 1-2. However, the starting preform 32 is in the shape of a generally flat disc having a generally circular cross-sectional shape. The starting disc 32 had a diameter of approximately 480 mm and a wall thickness of approximately 6 mm.

The starting preform 32 was reshaped into the dome 30 by a slumping process. Specifically, the starting preform 32 was placed on top of a concave mold (not shown). Then, the assembled starting preform 32 and mold were placed in a furnace (not shown) and heated to a temperature of approximately 1300° C., at which point the viscosity of the quartz glass of the starting preform 32 was approximately 10E10 poise. By gravity and vacuum, the heated and softened starting preform 32 then naturally slumped into the mold to form the shape of the dome 30. The dome 30 was then allowed to cool for approximately 10 hours, although a shorter cooling time may be employed. Finally, the dome 30 was spliced onto a tube body (not shown), preferably an opaque tube body, and fire polished.

The opaque quartz glass component in the form of the dome 30 was opaque and made of highly pure quartz glass.

More particularly, the dome 30 had an a chemical purity of at least approximately 95%, a density of at least approximately 2.10 g/cm$^3$, and a porosity of at most approximately 4.5%. Also, approximately 80% of the pores of the dome 30 had a maximum pore dimension of approximately 45 μm. The dome 30 also had a nearly constant direct spectral transmission of approximately 1% in the wavelength range of λ=190 nm to λ=4990 nm for a 3 mm wall thickness and a diffuse reflectance of at least 60% in a wavelength range of λ=190 nm to λ=2500 nm. The dome 30 also had a diameter of approximately 460 mm, a radius of curvature of approximately 440 mm and a wall thickness of approximately 6 mm.

Figure 6:
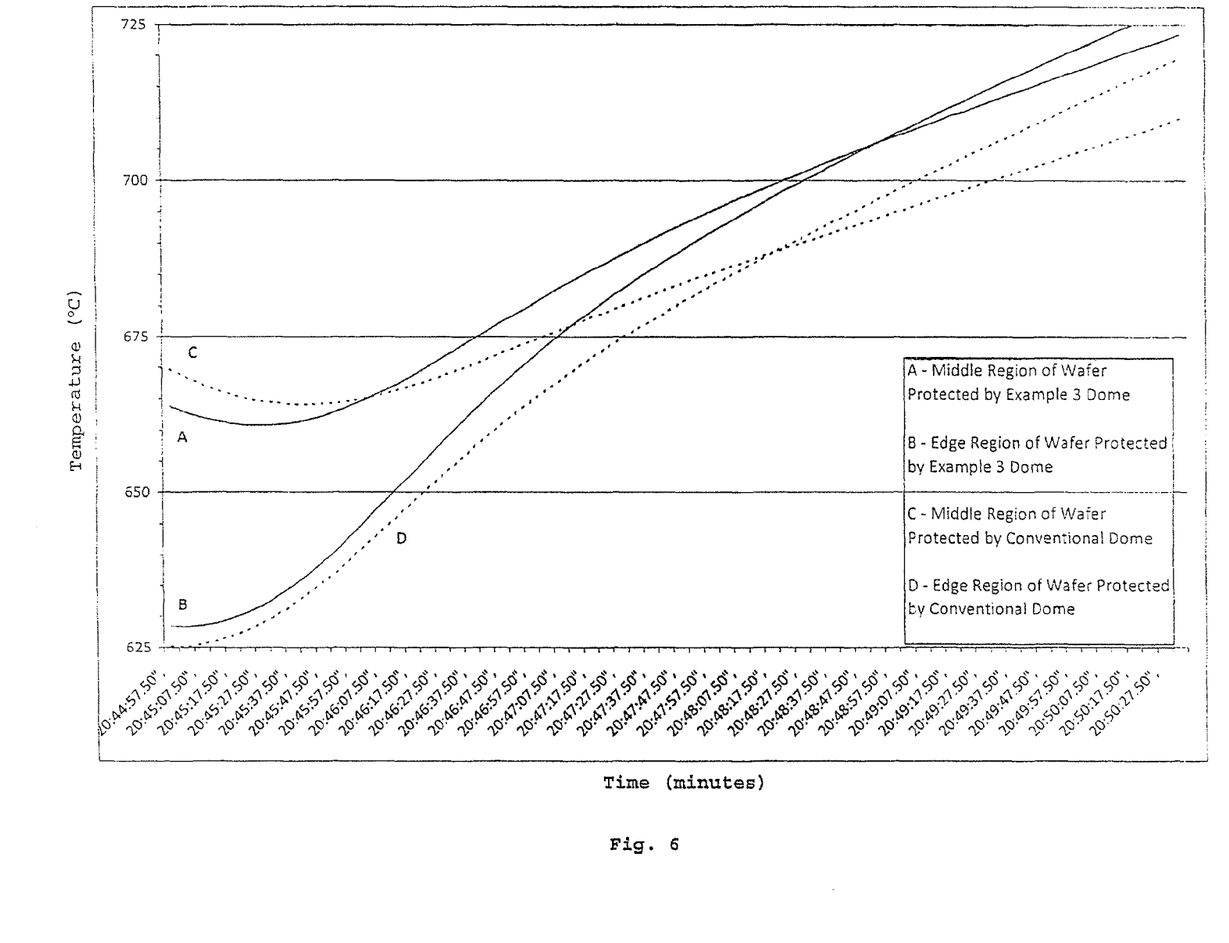
FIG. 6 is a graphical comparison of the temperature recovery of a wafer housed within a semiconductor processing chamber protected by the dome shown in FIG. 5 and a wafer housed within semiconductor processing chamber protected by a conventional clear quartz glass dome.

Performance of the opaque quartz glass dome 30 was then measured and compared with a conventional clear quartz glass dome during a simulated wafer exchange operation, as shown in FIG. 6. Specifically, FIG. 6 illustrates the temperature recovery of a wafer within a semiconductor furnace after the furnace door has been opened and closed for the wafer exchange operation. Once the wafer is properly positioned within the furnace, the middle region of the wafer is essentially completely covered by the dome 30, while the edge region of the wafer is less influenced by the dome 30. As shown in FIG. 6, the middle region of the wafer covered by the opaque dome 30 exhibits a relatively higher heating or heat recovery rate of approximately 14° C./minute. In contrast, the middle region of the wafer covered by the conventional dome exhibits a relatively lower heating or heat recovery rate of approximately 6° C./minute. There is a less stark difference in the heat recovery rates at the edge regions of the new wafers, as these regions are less influenced by the respective domes. However, the heat recovery rate of 15° C./minute of the edge region of the wafer covered by the opaque dome 30 is still slightly higher than the heat recovery rate of 12° C./minute of the edge region of the wafer covered by the conventional dome.

Thus, FIG. 6 clearly shows that the opaque quartz glass dome 30 of Example 3 better retains heat from the surrounding environment than the conventional dome. Specifically, the opaque quartz glass dome 30 according to the present invention thus provided for better temperature uniformity and faster temperature recovery than the clear quartz glass dome when the wafer was exchanged. More particularly, the semiconductor processing chamber protected by the opaque quartz glass dome 30 suffered less heat loss than that equipped with the conventional clear quartz glass dome. As such, the semiconductor wafer recovered temperature (i.e., heat) at a significantly faster rate during removal and reinsertion into the semiconductor processing chamber protected by the opaque quartz glass dome 30 as compared with a semiconductor wafer which was removed from and reinserted into the semiconductor processing chamber protected by the clear quartz glass dome.

It will be understood by those skilled in the art that while a comparison of an opaque quartz glass component according to the present invention is only described herein for an opaque quartz glass dome, the same effects would occur for an opaque quartz glass tube, tubular section or ring according to the present invention as compared with a clear quartz glass tube, tubular section or ring.

Example 4

Figure 8A:
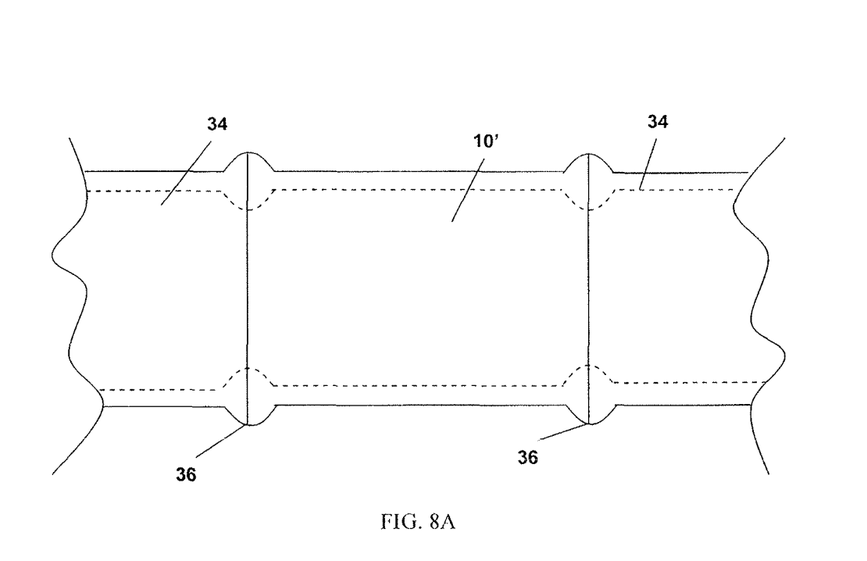
FIG. 8A is a side elevational view of the initial state of the tubular starting preform shown in FIG. 2 attached to clear glass tubes in accordance with an embodiment of the present invention.

A starting preform 10', as described in Example 2, was prepared. The starting preform 10' was then joined to a clear glass tube 34 at a joint seam 36, as shown in FIG. 8A. Then, while joined to the clear glass tube 34, the starting preform 10' was resized to the desired diameter of the spacer tube 26 by a blowing process to form all or part of a semiconductor chamber. Specifically, the starting preform 10' was horizontally-oriented, clear glass tubes 34 were attached to either end of the starting preform 10'. It will be understood that only one clear glass tube 34 may be attached to only one end of the starting preform 10'. Initially, there were non-uniformities or variations in the wall thickness and diameter between the starting preform 10' and the clear glass tubes 34 at the joint seams 36.

Figure 8B:
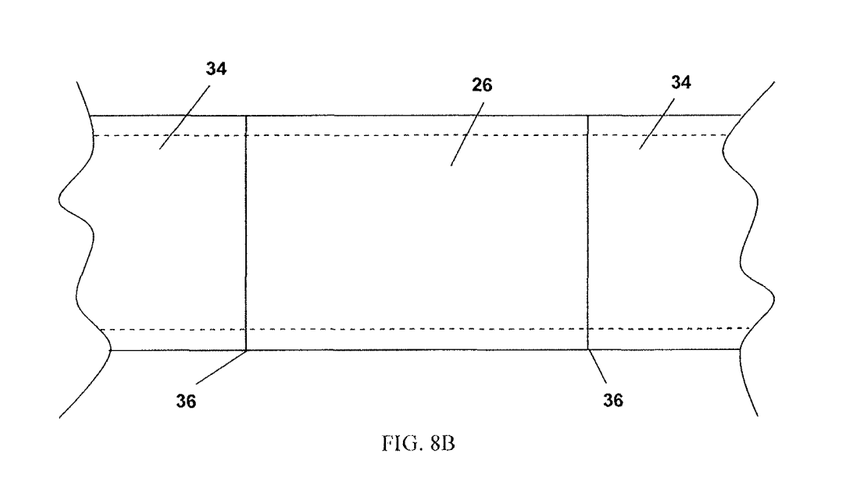
FIG. 8B is a side elevational view of the assembly shown in FIG. 8A after the tubular starting preform has been resized to form a short opaque tube in accordance with an embodiment of the present invention.

The starting preform 10' was then rotated about its longitudinal axis while successive zones of the starting preform 10' were heated and expanded to form an expanded opaque quartz glass spacer tube 26 of the desired diameter. Each zone may be heated multiple times. It will be understood that the same process utilized in Example 2 may be used for expansion of the starting preform 10'. During the successive and multiple heating steps, as the starting preform 10' was being resized, the non-uniformities or variations in the thicknesses and/or diameters at the joint seams 36 were gradually reduced. As shown in FIG. 8B, after the resizing process was completed, the non-uniformities or variations in the thicknesses and/or diameters at the joint seams 36 between the resulting opaque quartz glass spacer tube 26 and the clear glass tubes 34 were substantially reduced or eliminated. This was found to be marked improvement over the non-uniformities present at the joint seams of conventional semiconductor chambers, where the opaque spacer tube was first formed and the press welded to clear glass tubes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of forming an opaque quartz glass component, the method comprising:
   (a) providing a starting preform made of quartz glass, the starting perform having a direct spectral transmission of approximately 0.1 to 1% in a wavelength range of λ=190 nm to λ=4990 nm at a wall thickness of 3 mm and a diffuse reflectance of at least 60% in a wavelength range of λ=190 nm to λ=2500 nm and a density of at least 2.15 g/cm$^3$, at least 80% of pores of the starting preform having a maximum pore dimension of between 1 and 20 μm;
   (b) heating at least a portion of the starting preform to a predetermined temperature at which the quartz glass has a viscosity in a range of 10×10$^2$ to 10×10$^{12}$ poise and a density of at least 2.10 g/cm$^3$, at least 80% of pores of the heated preform having a maximum pore dimension of between 1 and 45 μm; and
   (c) deforming at least a portion of the heated preform at the predetermined temperature to change at least one of a shape and dimension(s) of the heated preform in order to form the opaque quartz glass component, the opaque quartz glass component having a direct spectral transmission of approximately 0.2 to 3% in a wavelength range of λ=190 nm to λ=4990 nm at a wall thickness of 3 mm and a diffuse reflectance of at least 60% in a wavelength range of λ=190 nm to λ=2500 nm.

2. The method according to claim 1, wherein the starting preform has a direct spectral transmission of approximately 0.1-0.5% in a wavelength range of λ=190 nm to λ=4990 nm at a wall thickness of 3 mm and the opaque quartz glass component has a direct spectral transmission of approximately 0.2 to 1.5% in a wavelength range of $\lambda=190$ nm to $\lambda=4990$ nm at a wall thickness of 3 mm and a diffuse reflectance of at least 60% in a wavelength range of $\lambda=190$ nm to $\lambda=2500$ nm.

3. The method according to claim 1, wherein the heated preform has a direct spectral transmission of approximately 0.2 to 3% in a wavelength range of $\lambda=190$ nm to $\lambda=4990$ nm at a wall thickness of 3 mm and a diffuse reflectance of at least 60% in a wavelength range of $\lambda=190$ nm to $\lambda=2500$ nm.

4. The method according to claim 1, wherein the starting preform has a porosity of at most 2.5% and the heated preform has a porosity of at most 5%.

5. The method according to claim 1, wherein the quartz glass has a chemical purity of at least 99.9% and a cristobalite content of no more than 1%.

6. The method according to claim 1, wherein the predetermined temperature is a temperature in a range of 1100° C. to 2300° C.

7. The method according to claim 1, wherein at least 80% of the pores of the starting preform have a maximum pore dimension of 15 to 20 μm.

8. The method according to claim 1, wherein at least 80% of the pores of the heated preform have a maximum pore dimension of 25 to 45 μm.

9. The method according to claim 1, wherein deforming of the heated preform is performed by one or more processes selected from the group consisting of blowing, drawing, slumping, and resizing.

10. The method according to claim 1, further comprising machining at least a portion of the starting preform prior to heating thereof.

11. The method according to claim 1, wherein the opaque quartz glass component is one of a tube, a section of a tube, a ring, and a dome.

12. The method according to claim 1 further comprising:
(i) attaching a first dummy tube to a first end of the starting preform and a second dummy tube to a second end of the starting preform;
(ii) rotating the starting preform about its longitudinal axis during heating of at least the portion of the starting preform; and
(iii) applying at least one of internal overpressure and internal centrifugal force to the starting preform generally simultaneously with the rotating thereof.

13. The method according to claim 1 further comprising:
(i) attaching a clear glass tube to a first end of the starting preform at a joint seam; and
(ii) resizing the starting preform to form an opaque quartz glass tube, such that the joint seam between the opaque quartz glass tube and the clear glass tube is substantially free of any non-uniformities.

* * * * *